Feb. 12, 1929.
G. T. KING
1,702,009
TRACTOR STEERING WHEEL
Filed June 4, 1926
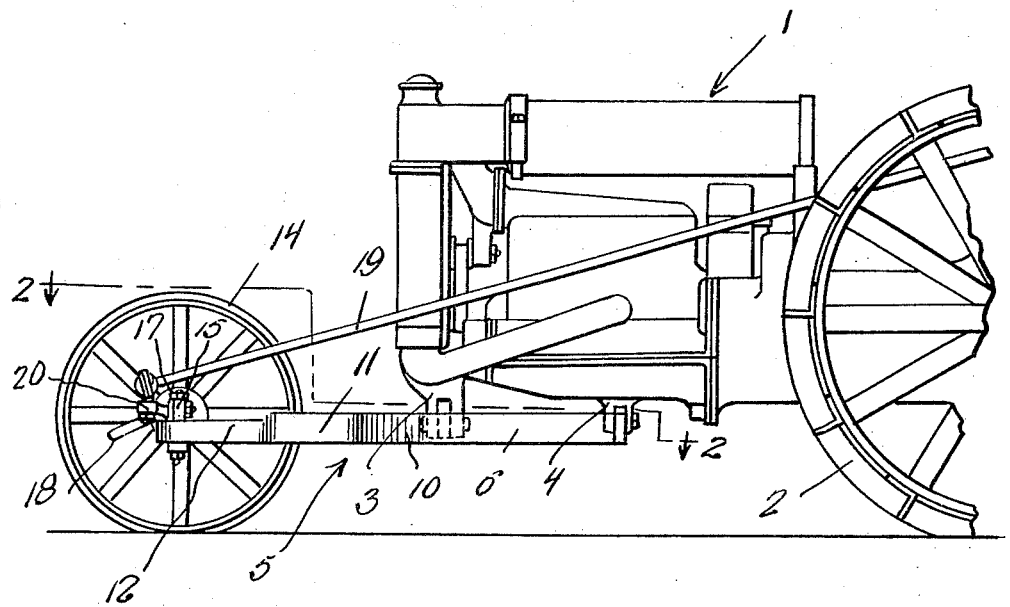
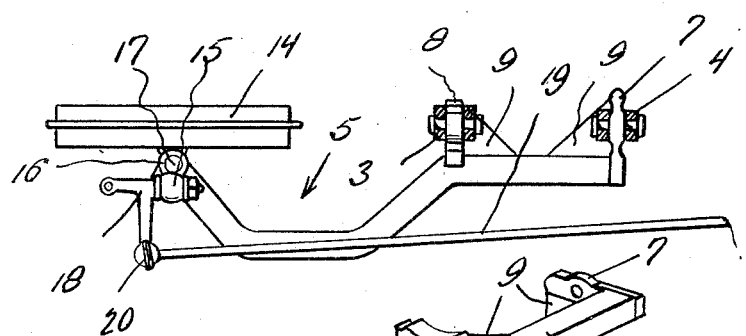
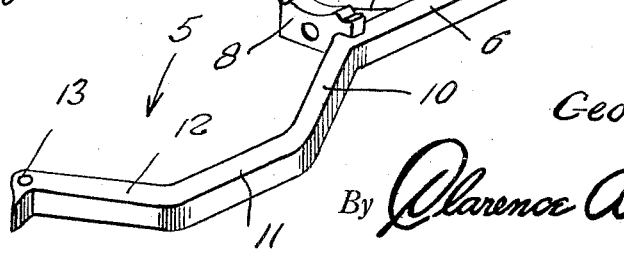
Inventor
George T. King,
By Clarence A. O'Brien
Attorney Patented Feb. 12, 1929.

1,702,009

UNITED STATES PATENT OFFICE.

GEORGE T. KING, OF CORPUS CHRISTI, TEXAS.

TRACTOR STEERING WHEEL.

Application filed June 4, 1926. Serial No. 113,725.

This invention relates to a device which is preferably in the form of an attachment for a Fordson tractor, the same having more particular reference to a structure which permits a single steering wheel to replace the two wheels ordinarily used at the front.

The purpose of the invention is to provide a single wheel located at a point to travel between the rows when cultivating and to thereby overcome the undesirable mashing of the rows caused by the ordinary front wheel structure.

The structural feature and advantages of the improvement will become apparent from the following description and drawing.

In the drawing:—

Figure 1 is a side view of the forward portion of a conventional form of tractor of the type specified showing the improved steering wheel in place.

Figure 2 is a horizontal section taken approximately upon the plane of the line 2—2 of Figure 1 looking downwardly and showing the steering mechanism more plainly.

Figure 3 is a perspective view of the part forming the gist of this invention.

In the drawing the reference character designates generally the tractor which includes the usual rear wheels 2. In addition, it is provided on its bottom with spaced brackets 3 and 4 which serve to accommodate the well known parts on the ordinary Fordson tractor.

The primary part of the invention comprises a novel supporting beam 5 which is represented in detail in Figure 3. This may be of rectangular cross section and it preferably includes a part 6 extending in substantial parallelism with the aforesaid brackets 3 and 4. At the rear end of this part is a lug 7 which extends between the depending portions of the bracket 4. Then at the forward end of this part is a second block-like lug 8 which extends between the depending ears of the bracket 3. Both of the lugs are reinforced by appropriate webs 9. Moreover, they are shaped to accurately conform to the portions of the tractor with which they cooperate. Then, as shown in Figure 2, pivot and retaining bolts pass through the ears of the bracket and the apertures in the lugs and serve to pivotally mount the beam 5 centrally upon the under side of the crank case of the tractor as shown. Beyond the lug 8 the beam includes a substantially U-shaped portion which may be said to include an arm 10 extending outwardly at an obtuse angle from the rear end portion 6, a bight portion 11 extending in substantial parallelism with the part 6, and a second arm 12 extending in reverse direction to the arm 10 and terminating in an apertured head 13. These lugs have their upper surfaces recessed as is clearly shown in Figure 3. The tractor saddle 23 as is common in Fordson tractors has a projection on either side, and these projections serve as bumpers in the ordinary construction. These projections, however, in the present instance, fit the recessed upper surfaces in the lugs 8. The front of the tractor rests firmly on these lugs, giving the front wheel constant alignment with the tractor. It is to be noted that the tractor weigh does not rest on pivot pins 3. This head constitutes a mounting for the steering wheel 14. This wheel 14 comprises one of the front wheels usually found on the tractor, and I prefer to employ a left hand front wheel for this purpose. Then too, I employ the usual connecting mechanism for mounting the wheel on the head. For instance, I employ the usual spindle body including a bearing 15 and right angularly disposed bearing 16 for accommodating the spindle 17 on the wheel. The reference character 18 designates a right angular part of the usual steering gear and this includes a pin which is connected with the bearing 17. One arm of this part 18 is disposed forwardly, while the steering rod 19 is connected to the outer end of the other inwardly extending arm through the medium of a universal joint 20. The steering rod, must of course, be lengthened considerably so that it may extend back to the driver's seat.

From the foregoing description it will be seen that I have evolved and produced a novel steering wheel attachment for a Fordson tractor wherein the same comprises mainly an especially constructed beam which may be pivotally mounted with the usual brackets on the bottom of the crank case of the tractor, and may also be connected with one of the front wheels and steering mechanism therefor without requiring alterations of the existing part. The attachment is to be used when cultivating, planting, etc. and it permits the use of a single steering wheel which is disposed to the center of the front of the tractor to take the place of the usual two front wheels which are set under a portion of the body of the tractor under ordinary conditions. By using a single wheel the tractor is easily guided and the single wheel runs in between the rows and does not interfere with the cultivating operation.

It is believed that by considering the description in connection with the drawings, persons familiar with devices of this class will be able to obtain a clear understanding of the same. Therefore, a more lengthy description is thought unnecessary.

Having thus described the invention, what I claim as new and desire to secure by Letters Patent is:—

A front wheel supporting means for a tractor comprising a single wheel, a beam disposed wholly in a horizontal plane and curved to provide an intermediate U-shaped portion with sides diverging from each other, from its bight, one side merging into a rearwardly straight extension, means for securing the straight extension below the tractor, and a steering knuckle rockable on the end of the other side, to support said wheel.

In testimony whereof I affix my signature.

GEORGE T. KING.